US009510993B2

(12) United States Patent
    Te

(10) Patent No.: US 9,510,993 B2
(45) Date of Patent: Dec. 6, 2016

(54) SMART GUIDE FOR USE BY VISUALLY IMPAIRED PERSONS

(71) Applicant: Linda Te, Philadelphia, PA (US)

(72) Inventor: Linda Te, Philadelphia, PA (US)

(*) Notice: Subject to any disclaimer, the term of this patent is extended or adjusted under 35 U.S.C. 154(b) by 0 days.

(21) Appl. No.: 14/624,432

(22) Filed: Feb. 17, 2015

(65) Prior Publication Data
US 2015/0238383 A1    Aug. 27, 2015

Related U.S. Application Data

(60) Provisional application No. 61/941,403, filed on Feb. 18, 2014.

(51) Int. Cl.
    G06F 17/30      (2006.01)
    A61H 3/06       (2006.01)
    G01S 19/13      (2010.01)
    G01S 19/14      (2010.01)
    G01C 21/26      (2006.01)
    G01C 21/36      (2006.01)
    G09B 21/00      (2006.01)

(52) U.S. Cl.
    CPC ............ *A61H 3/061* (2013.01); *G01C 21/265* (2013.01); *G01C 21/3608* (2013.01); *G01C 21/3629* (2013.01); *G01S 19/13* (2013.01); *G01S 19/14* (2013.01); *G09B 21/007* (2013.01); *A61H 2003/065* (2013.01); *A61H 2201/0153* (2013.01); *A61H 2201/5048* (2013.01); *A61H 2201/5058* (2013.01); *A61H 2201/5097* (2013.01)

(58) Field of Classification Search
    CPC ..... G09B 21/001; G09B 21/006; G01C 21/00; G01C 21/265; G01C 21/3608; G06F 17/30082; H04L 12/14; H04L 12/5895
    USPC ........ 701/468, 472, 487; 340/4.11; 345/156; 455/466
    See application file for complete search history.

(56) References Cited

U.S. PATENT DOCUMENTS

| 6,502,032 | B1* | 12/2002 | Newman | G09B 21/003 345/156 |
| 8,988,355 | B2* | 3/2015 | Solomon | G06F 1/1662 345/168 |
| 2003/0179133 | A1* | 9/2003 | Pepin | A61H 3/061 342/357.52 |
| 2005/0140544 | A1* | 6/2005 | Hamel | A61H 3/061 342/357.52 |
| 2006/0238503 | A1* | 10/2006 | Smith | G06Q 99/00 345/156 |
| 2007/0021915 | A1* | 1/2007 | Breed | B60N 2/2863 701/301 |
| 2012/0062357 | A1* | 3/2012 | Slamka | G01C 21/20 340/4.11 |
| 2013/0002452 | A1* | 1/2013 | Lauren | G09B 21/006 340/944 |
| 2013/0335327 | A1* | 12/2013 | Solomon | G06F 1/1662 345/168 |

* cited by examiner

*Primary Examiner* — McDieunel Marc
(74) *Attorney, Agent, or Firm* — Ruth Eure

(57) ABSTRACT

A guiding device for use by visually impaired persons comprising: a compact, handheld GPS navigation system having a Braille keyboard, voice controlled operation, and a verbal response mode for indicating routes, directions, and alerts regarding obstacles in a user's path.

9 Claims, 1 Drawing Sheet

SMART GUIDE FOR USE BY VISUALLY IMPAIRED PERSONS

CLAIM OF PRIORITY

This patent application claims priority under 35 USC 119(e)(1) from U.S. Provisional Patent Application Ser. No. 61/941,403 filed Feb. 18, 2014, of common inventorship herewith entitled, "The Smart Guide," which is incorporated herein by reference as though the same were set forth in its entirety.

FIELD OF THE INVENTION

The present invention pertains to the field of electronics, and more specifically to the field of electronic personal devices for visually impaired individuals.

BACKGROUND OF THE INVENTION

The prior art has put forth several designs for electronic personal devices for visually impaired individuals. Among these are:

U.S. Pat. No. 7,930,212 to Susan Perry and Richard Herbst describes an electronic talking menu system for the visually impaired. The system includes a battery powered portable electronic audio output device having large back lighted buttons corresponding to menu items. Each button corresponds to contents of a restaurant's menu such as appetizers, drinks, seafood or desserts. Pressing a particular button activates a prerecorded description of the menu item or menu items within the selected category. An electronic menu system provides a system for enabling a visually impaired person to review and select desired menu items using audio feedback. Delivery of prerecorded content is accomplished with either a logically managed service wherein formatted sound files are uploaded to a memory card from a personal computer via the Internet or a courier based service wherein formatted memory cards are delivered to restaurants via a third party parcel delivery service with a round robin mailer to exchange memory cards.

US Patent 2005/0140544 to Pierre Hamel, Manon Gaudet, Daniel Chabot and Marc Laframboise describes a system for orienting and guiding visually impaired pedestrians. The system combines a Global Positioning System or GPS receiver to a dead reckoning unit that compensates for GPS imprecision and loss of signal. The system is highly portable and is based on a handheld portable computing platform that communicates wirelessly with a self powered strap containing the GPS receiver and the dead reckoning unit. The system also uses wireless protocols to receive additional orientation information from a remote location server or operator accessible through the internet. A positioning algorithm for mapping the user near a street intersection is provided.

U.S. Pat. No. 6,502,032 to George H. Newman describes a global positioning system that actively guides blind pedestrians, and military and police forces. This system uses DOD Global Positioning System or GPS to provide user position and navigation to centimeter accuracy. Present position and navigation requests are digitally cellular telephoned to a central base station where data is correlated with a computerized map database which holds names and coordinates of specific locations such as streets, intersections, traffic lights, hospitals, bathrooms, public telephones and internal layouts of major buildings and facilities in selected regions, cities and neighborhoods. System operates by user entering desired destination into hand held unit via voice recognition software or using Braille keyboard. Hand held unit then transmits present position or PP GPS satellite signals and desired destination to a base station which contains map database and surveyor quality GPS computer system.

None of these prior art references describe the present invention.

SUMMARY OF THE INVENTION

It is an object of the present invention to provide a compact handheld GPS navigation system having a Braille keyboard, voice controlled operation, and a verbal response mode for indicating routes, directions, and alerts regarding obstacles in a user's path.

DETAILED DESCRIPTION OF THE INVENTION

Figure 2:
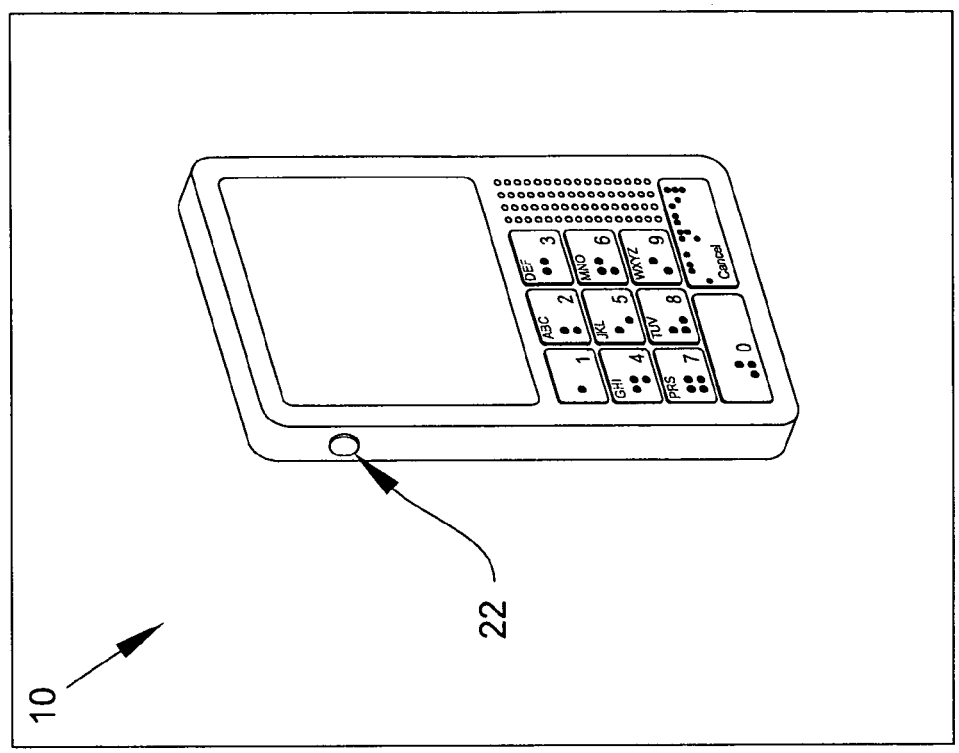
FIG. 2 is an illustrative prototypical front diagonal view showing an On and Off Switch on the present invention.
Figure 1:
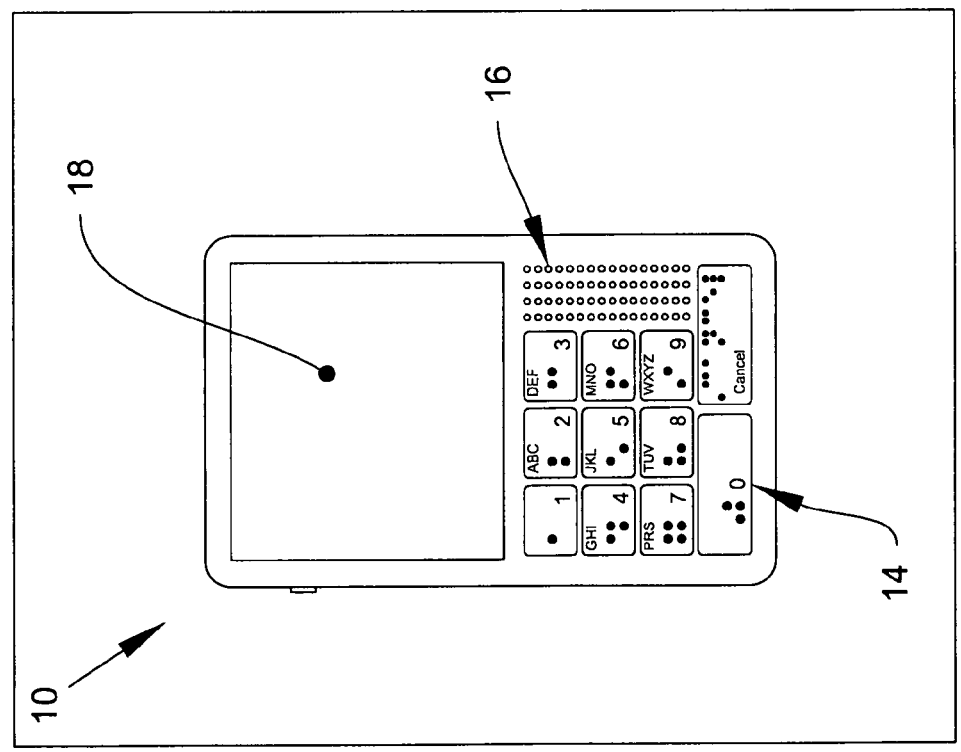
FIG. 1 is an illustrative prototypical front view showing a screen, a Braille keyboard and a speaker component located on the present invention.

Humans receive and perceive their outer world through their five senses of sight, touch, taste, smell, and hearing. Although these senses function in every aspect of one's waking existence, one's dependence on these senses is distributed unequally. This sensory inequality is true of all animals many of whom possess sensory apparatus unshared by humans. Some snakes sense nearby body warmth of a mouse or vole and hone in on such prey like a heat seeking missile. Many animals from insects to dogs depend largely on a sense of smell far more acute than a human's sense of smell. Owls hunt nocturnally. An owl's night vision is extraordinary, but their hearing is even more acute. The highly sensitive hearing apparatus of bats includes external ears that are truly gigantic in relation to their heads. Bats emit almost subsonic sounds which they use like radar to locate their flying insect prey by echo. The sense of sight took precedence over other senses for mammalian primates such as lemurs, monkeys, apes and man. Primates have forward looking eyes, overlapping or stereoscopic visual fields, and color vision. The stationary outer ears or pinnae of most primates are unmoveable. In securing food and mates, and detecting and avoiding predators, most primates rely primarily on sight while their olfactory and auditory senses perform at best an auxiliary role. There is one primate in particular, homo sapien, to whom hearing became an absolutely vital sense with the advent of spoken languages.

Of all the senses we might lose through genetic misfortune, aging, accident or illness, sight generally is regarded as the most crucial and greatest loss. Persons deprived of their sight navigate through a pitch black world by relying on their other senses to a degree that sighted persons only can imagine. The blind individual relies heavily on touch and hearing such as the feel of varying surfaces tapped with a white cane, touching bumps of braille that convey written language, listening to sounds of people and traffic and hearing echoes within a room. The number of blind individuals with guide dogs is a small minority. Even those with a guide dog sometimes must navigate with a cane.

Please refer to the Figures. The present invention, hereinafter referred to as The Smart Guide for Visually Impaired Persons, or simply, the Smart Guide, is a compact handheld GPS navigation system 10 having a Braille keyboard 14, speaker 16, screen 18, voice controlled operation, and a verbal response mode for indicating routes, directions, and alerts regarding obstacles in a user's path. The Smart Guide provides blind or severely visually impaired individuals with a superior tool for navigating their way in a dark or unfocused world. The Smart Guide is a compact device similar in size to a pack of cigarettes or a smart phone, approximately three to four inches in width, and approximately four to five inches in length. The device is powered by a rechargeable internal battery or battery pack. An adapter charger cord is included with the present invention. The device also comprises an On/Off button 22 on the side of the device The Smart Guide functions as a route and direction giving GPS device. Instead of a having a display screen to show routes, directions, and locations, the Smart Guide conveys this information through automated voice communication. The Smart Guide uses voice recognition and voice controlled operation. The Smart Guide contains a Braille keypad for manual entry. The Smart Guide has a built in subsonic or radar like capability to detect obstacles such as traffic, curbs or steps. When obstacles are in a user's path, the automated voice issues a specific warning or route recommendation. The Smart Guide is configured to guide the blind or sight impaired individual step by step from his or her location to their destination. The Smart Guide is operable in a handheld mode or as a detachable accessory to a white cane. The Smart Guide has a bracket for mounting it removably on a cane. A toggle switch located on The Smart Guide indicates whether the device is handheld or attached to a cane.

The Smart Guide is an advanced electronic navigation system for the blind. The Smart Guide equips a visually impaired person with a personal and portable radar system, seeking out obstacles in front and to either side of the user and relaying this information with sound. Aware of the obstacles, the user proceeds with appropriate caution. The present invention provides visually handicapped individuals with the same GPS locational, tracking, and route or directional capabilities to which sighted individuals have access.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A guiding device for use by visually impaired persons comprising:
    a compact, handheld GPS navigation system having a Braille keyboard, voice controlled operation, and a verbal response mode for indicating routes, directions, and alerts regarding obstacles in a user's path, and
    a built in subsonic or radar like capability to detect obstacles such as traffic, curbs or steps, and when obstacles are in a user's path, an automated voice issues a specific warning and route recommendation.

2. The guiding device for use by visually impaired persons of claim 1, wherein the guide is a compact device similar in size to a pack of cigarettes or a smart phone, approximately three to four inches in width, and approximately four to five inches in length.

3. The guiding device for use by visually impaired persons of claim 1, wherein the device is powered by a rechargeable internal battery or battery pack.

4. The guiding device for use by visually impaired persons of claim 3, further comprising an included adapter charger cord.

5. The guiding device for use by visually impaired persons of claim 1, wherein the device functions as a route and direction giving GPS device, capable of conveying this information through automated voice communication, using voice recognition and voice controlled operation.

6. The guiding device for use by visually impaired persons of claim 1, comprising a Braille keypad for manual entry.

7. The guiding device for use by visually impaired persons of claim 1, wherein the device is operable in a handheld mode or as a detachable accessory to a white cane.

8. The guiding device for use by visually impaired persons of claim 1, further comprising a bracket for mounting it removably on a cane.

9. The guiding device for use by visually impaired persons of claim 1, further comprising a toggle switch located on device to indicate whether the device is handheld or attached to a cane.

\* \* \* \* \*